May 31, 1960     J. T. ARMBRUSTER ET AL     2,938,426

REFRACTORS

Filed Dec. 31, 1956

INVENTORS
JOHN T. ARMBRUSTER
JOHN R. WRIGHT
BY
Herbert C. Kimball
ATTORNEY

United States Patent Office 2,938,426
Patented May 31, 1960

2,938,426

REFRACTORS

John T. Armbruster, Niagara Falls, and John R. Wright, Eggertsville, N.Y., assignors to American Optical Company, Southbridge, Mass., a voluntary association of Massachusetts Filed Dec. 31, 1956, Ser. No. 631,709

2 Claims. (Cl. 88—20)

This invention relates to refractors, devices which carry a wide range of trial lenses movable into viewing positions in front of the patient's eyes so that the examining practitioner may determine whether a correction is called for and what it should be. In general in such devices, a series of lenses may be carried by a disc which is rotatable so that any lens carried by the disc may be brought into viewing position. For the information of the practitioner a dial carries diopter or other suitable markings corresponding to the power or other characteristics of the respective lenses, and the marking for a particular lens becomes visible through the outside casing or housing as that lens reaches viewing position.

Because of the wide range of lenses which preferably should be included in the refractor, these lenses are generally mounted on a plurality of discs, and mechanism such as a Geneva movement is provided within the housing for relating the rotation of a disc carrying low power lenses to the rotation of a disc carrying higher power lenses. A disclosure of an improved form of such mechanism is found in the copending application of John R. Wright and George F. Schenk, Serial No. 629,059 filed December 18, 1956, for Refractor, assigned to the assignee of the present application. All of this tends to increase the thickness or bulk of each cell. Accordingly, this bulk tends to obstruct the practitioner's view of the above mentioned diopter markings, especially when he is not standing directly in front but somewhat toward the right or left side.

We have alleviated this condition by mounting where it will cooperate with the diopter markings, a magnifying lens having sufficient prismatic power to assist the practitioner in reading the marking when he is standing in an off-center position.

Our invention is illustrated in the accompanying drawing in which.

Figure 1:
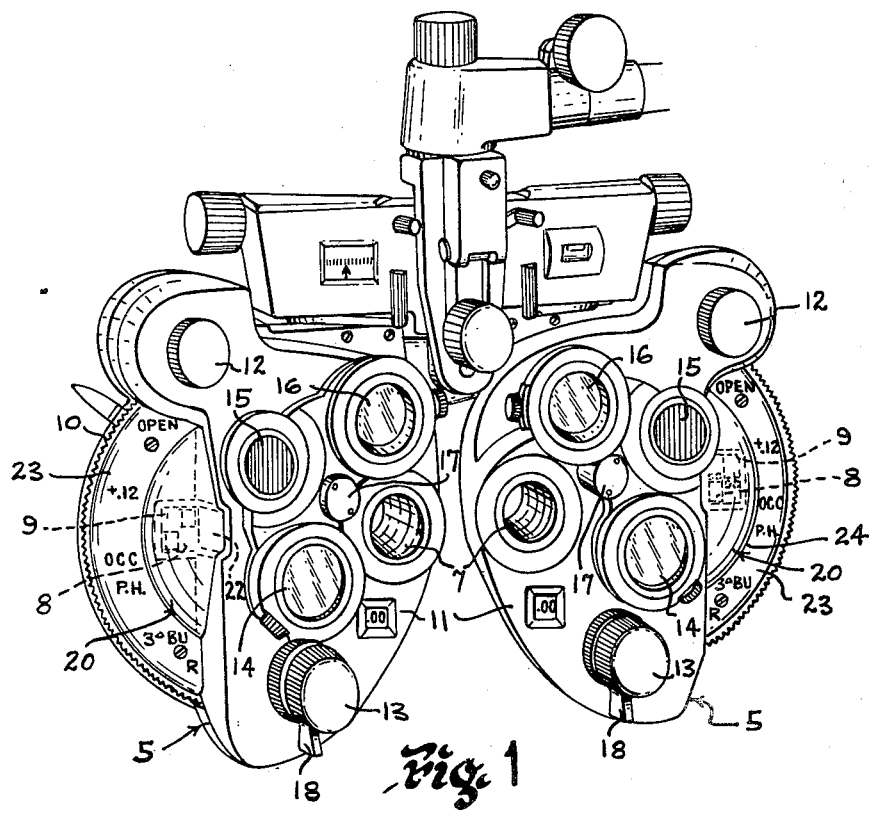
Fig. 1 is a perspective view from the practitioner's side of a refractor, each of the cells being provided with our improved prismatic magnifier for reading the dial markings.

Referring to Figure 1 of the drawings, we have shown a refractor. The cells 5 of such an instrument, as is well known, house a wide range of lenses which as selected by the practitioner may be positioned singly or in combination in the sight tubes 7 of the instrument. For each cell, a dial 8 which is visible at 9 through the cell housing 10 indicates to the practitioner the effective dioptric power in front of the eye of the patient. Because it is necessary or desirable to afford a wide range of powers, a plurality of discs are mounted in each cell 5, each disc carrying a series of lenses, and mechanism such as a Geneva movement is provided for causing the rotation of the disc carrying the low power lenses to be properly related to the rotation of the disc carrying higher power lenses. The latter disc may be directly operated by the control knob 12.

To test for astigmatic errors the instrument provides a considerable range of cylindrical power lenses on discs which are confined within the supplemental housings 11. For each cell, this supplemental housing extends forwardly far enough to contain not only the drive for the discs carrying the cylinder lenses, but also the mechanism for orienting the cylinder axis. The drive is actuated by the knob 13 to bring a selected lens into the sight tube 7 and the orienting mechanism is actuated by the handle 18 to determine the axis of the selected lens.

The supplemental housing 11 tends to obscure the opening 9, particularly the opening 9 which is the more remote from the practitioner as he stands to one side of the line of sight of the patient and this situation is not improved by the cluster of loupes 14, 15, and 16 carried by a turret 17 rotatably mounted on the front of housing 11. No real difficulty in reading the dial markings would be experienced by the practitioner if the eye examination were conducted under normal lighting conditions and if he viewed only the nearer cell and viewed it from the angle at which the perspective view in Figure 1 is taken. Generally the eye examination is conducted in semi-obscurity, however, and the practitioner would see only the dial markings for one eye from this advantageous angle, and he would have greater difficulty in seeing the dial markings for the other eye as is apparent from Fig. 1.

We have provided, in accordance with our invention, a magnifier 20 of suitable transparent material such as methyl methacrylate which cooperates with the opening 9 so as to assist the practitioner in reading the dial markings. Furthermore, this magnifier is formed and arranged to have a prismatic effect so as to bring the dial markings into view even though the practitioner is standing at a disadvantageous angle.

Figure 2:
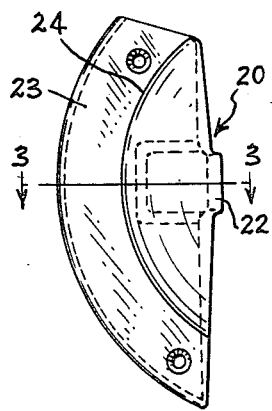
Fig. 2 is a front view of the prismatic magnifier.
Figure 3:
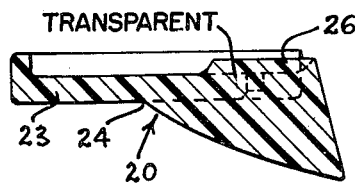
Fig. 3 is a transverse section on the line 3—3 of Fig. 2.

Referring to Figures 2 and 3 it will be seen that the magnifier 20 is adapted to be fitted into the angle between the housing 10 and the supplemental housing 11. As is apparent from Figures 1 and 2 the housing 11 is relieved somewhat to receive the extension 22 of the magnifier 20. The exposed face of the magnifier 20 has uniform curvature from the extension 22 down to where the magnifier merges with a flat flange 23 which overlies the housing 10. A curved line 24 indicates the juncture of the curved face of magnifier 20 and its flat extension 23. The under face of magnifier 20 is stepped down at 26 into the opening 9.

As is apparent from Figure 3, a chord of the curved top surface of magnifier 20 is at a considerable angle to the plane of the flange 23 and underlying housing 10. Accordingly there is considerable prismatic effect in the magnifier as arranged in the instrument. Because of this the magnifier functions in two ways in assisting in reading the dial markings.

In the first place the prismatic effect enables a practitioner to move from side to side of the refractor through a fairly wide range without losing sight of the dial markings. The extension 22 on the magnifier increases this range. In fact it is seldom that the eye examination is conducted from a position directly in front of the instrument where it would interfere with the line of sight of the patient, and the practitioner's position is generally to one side. It will be apparent from Fig. 1 that the prismatic effect of the magnifier 20 makes such a range possible.

In the second place the magnifier enlarges the markings, which is a convenience to the practitioner where illumination is cut down. Since the accuracy of the prescription is dependent on this reading, the improved visibility of the marking is of importance. In addition the magnifier 20 closes the opening 9 and protects the interior of housing 10 from dust and dirt.

We claim:

1. In a refracting instrument the combination with a pair of main housings, each providing a sight tube, each enclosing a series of lenses for selective positioning in said sight tube to refract the respective eye of a patient and each having an opening for the reading of the powers of the lenses selected from said series, and a pair of supplementary housings each enclosing a series of supplementary test lenses for selective positioning in said sight tube and each projecting forwardly from one of said main housings to form a shoulder, a pair of dials one visible through the opening in each of said main housings for indicating the effective dioptric power of the lenses of the first series positioned in the respective sight tube, of a transparent closure for each of said openings, said closure being formed as a magnifying lens with prismatic effect for permitting viewing of said dial past said shoulder.

2. In a refracting instrument the combination with a pair of main housings, each providing a sight tube, each enclosing a series of lenses for selective positioning in said tube to refract the respective eye of a patient and each having an opening for the reading of the powers of the lenses selected from said series, a pair of supplementary housings each enclosing a series of supplementary test lenses for selective positioning in said sight tube and each projecting forwardly from one of said main housings to form a shoulder, said shoulder being relieved adjacent said opening in the first housing to form a recess, and a pair of dials one visible through the opening in each of said main housings for indicating the effective dioptric power of the lenses of the first series positioned in the respective sight tube, of a transparent closure for each of said openings, said closure being formed as a magnifying lens with prismatic effect for permitting viewing of said dial past said shoulder and having an extension within the recess formed in said shoulder.

References Cited in the file of this patent

UNITED STATES PATENTS

| | | |
|---|---|---|
| 427,688 | Hooper | May 13, 1890 |
| 767,392 | Dewaine | Aug. 16, 1904 |
| 1,678,479 | Patten et al. | July 24, 1928 |
| 1,937,228 | Jordan | Nov. 28, 1933 |
| 1,945,940 | Hunsicker | Feb. 6, 1934 |
| 2,036,337 | Knapp | Apr. 7, 1936 |
| 2,117,441 | McWeeny | May 17, 1938 |
| 2,329,907 | Jobe et al. | Sept. 21, 1943 |
| 2,470,012 | Bergmans et al. | May 10, 1949 |
| 2,707,901 | Thorburn | May 10, 1955 |
| 2,843,935 | Gerber | July 22, 1958 |